(12) United States Patent
Canny

(10) Patent No.: US 7,233,650 B1
(45) Date of Patent: Jun. 19, 2007

(54) MANAGING CALLER IDENTIFIERS AT A COMMUNICATION DEVICE

(75) Inventor: Eoin M. Canny, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/430,158

(22) Filed: May 5, 2003

(51) Int. Cl.
*H04M 1/56* (2006.01)
*H04M 1/64* (2006.01)
*H04M 1/00* (2006.01)

(52) U.S. Cl. .............. 379/142.01; 379/88.11; 379/354

(58) Field of Classification Search ........... 379/88.11, 379/88.21, 88.23, 142.06
See application file for complete search history.

(56) References Cited

U.S. PATENT DOCUMENTS

| 5,146,490 | A |   | 9/1992 | Beckman ................ 379/113 |
| 5,644,629 | A | * | 7/1997 | Chow .................. 379/142.07 |
| 5,651,054 | A |   | 7/1997 | Dunn et al. ................. 379/67 |
| 5,799,073 | A | * | 8/1998 | Fleischer et al. ....... 379/112.01 |
| 6,026,152 | A | * | 2/2000 | Cannon et al. ........ 379/142.06 |
| 6,282,275 | B1 | * | 8/2001 | Gurbani et al. ........ 379/142.06 |
| 6,295,340 | B1 | * | 9/2001 | Cannon et al. ............ 379/88.1 |
| 2002/0064263 | A1 | * | 5/2002 | McBrearty et al. .... 379/142.01 |

OTHER PUBLICATIONS

Slawson, Michael W., "Caller ID Basics," http://www.testmark.com/develop/tml_callerid_cnt.html, 10 total pages, Printed Apr. 15, 2003.

* cited by examiner

*Primary Examiner*—Fan Tsang
*Assistant Examiner*—Joseph T Phan
(74) *Attorney, Agent, or Firm*—Baker Botts L.L.P.

(57) ABSTRACT

Managing caller identifiers includes communicating calls at a communication device, where each call is associated with a caller identifier. The caller identifiers for the calls are stored in response to the communication. A sort command is accessed, and the caller identifiers are organized in accordance with the sort command. The organized caller identifiers are displayed to manage the caller identifiers.

20 Claims, 2 Drawing Sheets

MANAGING CALLER IDENTIFIERS AT A COMMUNICATION DEVICE

TECHNICAL FIELD OF THE INVENTION

This invention relates generally to the field of telecommunications and more specifically to managing caller identifiers at a communication device.

BACKGROUND OF THE INVENTION

Caller identification (ID) is a feature according to which a communication device displays a caller identifier associated with an incoming call. Caller identification, however, may be ineffective for performing some tasks. Consequently, known techniques for providing caller identifiers may be unsatisfactory in certain situations.

SUMMARY OF THE INVENTION

In accordance with the present invention, disadvantages and problems associated with previous techniques for managing caller identifiers may be reduced or eliminated.

According to one embodiment of the present invention, managing caller identifiers includes communicating calls at a communication device, where each call is associated with a caller identifier. The caller identifiers for the calls are stored in response to the communication. A sort command is accessed, and the caller identifiers are organized in accordance with the sort command. The organized caller identifiers are displayed to manage the caller identifiers.

Certain embodiments of the invention may provide one or more technical advantages. A technical advantage of one embodiment may be that a user of a communication device may select the manner in which caller identifiers are to be displayed on the communication device. Accordingly, the embodiment may provide for more effective management of caller identifiers.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
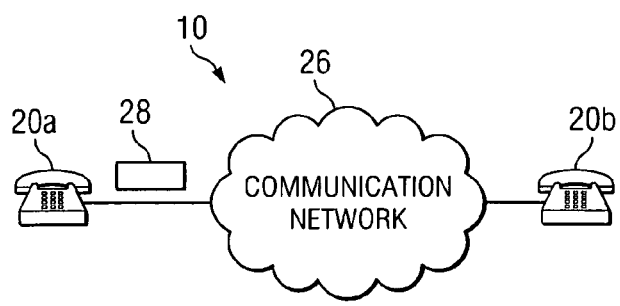
FIG. 1 is a block diagram of one embodiment of a system including a communication device that may be used to manage caller identifiers.

FIG. 1 is a block diagram illustrating one embodiment of a system 10 that includes a communication device that may be used to manage caller identifiers. The communication device stores caller identifiers of calls communicated to and from the communication device. A user of the communication device may provide a sort command that is used to organize and display the stored caller identifiers.

According to one embodiment, system 10 includes communication devices 20a–b coupled to a communication network 26 as illustrated in FIG. 1. Communication device 20a sends calls to or receive calls from communication device 20b, and determines a caller identifier and other caller identifier information corresponding to communication device 20b. The caller identifier information may include, for example, the caller identifier such as a telephone number, a name associated with the telephone number, or both, and may also include the date of the call, the time of the call, or any other suitable information.

A caller identifier for a call initiated by communication device 20a may be determined as the identifier is entered into communication device 20a to place the call. A caller identifier for a call received by communication device 20a may be determined according to any suitable caller identification (caller ID) technique. According to one example, the caller identifier may be included in a message 28 sent from a central office of the communication network 26.

According to the example, message 28 may include a channel seizure string, a mark string, the caller identifier information, and a checksum. The channel seizure signal and the mark signal may be used to prepare communication device 20a for receipt of the caller identification information. The channel seizure may comprise a string of continuous bits of alternating zeros and ones, and the mark signal may comprise mark bits.

The caller identifier information may be sent in any suitable format such as a single data message or a multiple data message. A single data message may include a date, time, and telephone number associated with the call, and a multiple data message may include a date, time, telephone number, and name associated with the call. The name field, the telephone number field, or both may include data indicating that the caller identifier information has been blocked by the caller or is otherwise unavailable.

According to the example, caller identifier information may be transmitted using frequency shift keyed (FSK) modem tones, which may be used to transmit a display message in American Standard Code for Information Interchange (ASCII) character code form. A frequency such as 1200 hertz may be used to represent a mark, and a frequency such as 2200 hertz may be used to represent a space. The data may be sent asynchronously between the first and second ring at a signal level of −13.5 dBm.

Communication device 20a–b may comprise, for example, a personal digital assistant, a cellular or other telephone, a computer, or any other device suitable for communicating data packets to and from communication network 26. Communication device 20a–b may support, for example, simple Internet Protocol (IP), mobile IP, or any other suitable communication protocol. Communication device 20a–b may utilize, for example, Global System for Mobile communications (GSM) technology or any other suitable mobile or fixed communication technology.

Communication network 26 allows communication device 20a–b to communicate with other networks or devices. Communication network 26 may comprise a public switched telephone network (PSTN), a public or private data network, the Internet, a wireline or wireless network, a local, regional, or global communication network, an enterprise intranet, other suitable communication link, or any combination of the preceding. According to one embodiment, switches of communication network 26 may support Signaling System 7 (SS7).

Modifications, additions, or omissions may be made to system 10 without departing from the scope of the invention. Moreover, the operations of system 10 may be performed by more or fewer modules. Additionally, functions may be performed using any suitable logic comprising software, hardware, other logic, or any suitable combination of the preceding. As used in this document, "each" refers to each member of a set or each member of a subset of a set.

System 10 may provide advantages over known techniques such as the call log, speed dial, and directory features. The call log feature may display information about outgoing calls, incoming calls, and missed calls. The call log feature, however, does not allow the user to sort the information. The speed dial feature and directory feature may allow a user to store and call telephone numbers. These features, however, require a user to program the telephone numbers into the communication device.

Figure 2:
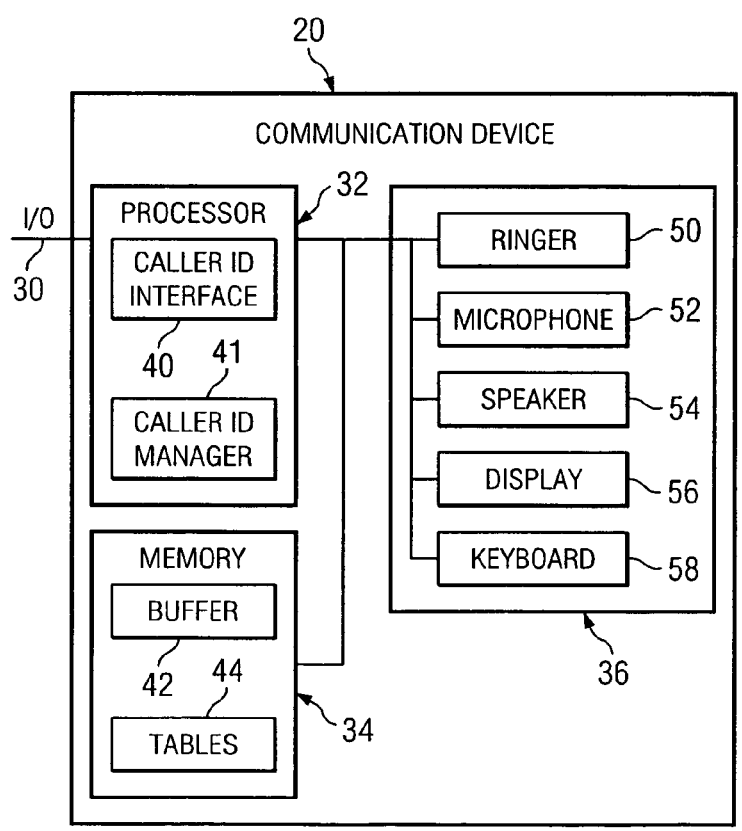
FIG. 2 is a block diagram of one embodiment of a communication device that manages caller identifiers.

FIG. 2 is a block diagram of communication device 20 that may be used to manage caller identifiers. Communication device 20 stores caller identifiers associated with calls communicated by communication device 20, organizes the caller identifiers, and displays the organized caller identifiers to a user.

According to the illustrated embodiment, communication device 20 comprises an input/output (I/O) 30, a processor 32, a memory 34, and one or more user input/output 36 modules coupled as shown in FIG. 2. Input/output 30 communicates signals to and from communication network 26. The signals may comprise data packets communicating information such as data, video, multi-media, any other suitable type of information, or any combination of the preceding.

Processor 32 manages the operations of communication device 20, and may comprise any suitable device operable to accept input, process the input according to predefined rules, and produce output. According to the illustrated embodiment, processor 32 may include a caller identifier interface 40 and a caller identifier manager 41. Caller identifier interface 40 may extract caller identifier data from message 28 by interpreting interface 40 may interpret a series of tones received from input/output 30 to generate caller identifier information.

Caller identifier manager 41 may store caller identifiers in memory 34, organizing the caller identifiers, and prepare the caller identifiers for output through user input/output modules 36. Caller identifier manager 41 may also track the number of calls communicated to or from communication device 20b to determine a count value for communication device 20b.

Caller identifier manager 41 may organize caller identifiers in response to a sort command. The sort command may comprise a default command or a command received from a user, and may instruct caller identifier manager 41 to organize the caller identifiers in any suitable order. For example, caller identifiers may be organized by time and date such as from the more recent calls to the later calls or from the later calls to the more recent calls. As another example, the caller identifiers may be organized according to count values from, for example, a higher count value to a lower count value or from a lower count value to a higher count value. As yet another example, caller identifiers may be organized according to the alphabetical order of the names of the caller identifiers. As yet another example, caller identifiers may be organized according to whether the telephone number of the caller identifier is associated with an internal or external telephone or with an international or local phone number.

Memory 34 may comprise any suitable device that can store information, and may include one or more buffers 42 and one or more tables 44. Buffers 42 may be used to store caller identifier information extracted by caller identifier interface 40. Tables 44 may be used to organize the stored identifiers. An example of a table 44 is illustrated by TABLE 1.

TABLE 1

| Phone Number | Name | Time | Date | Count Value | Other |
| --- | --- | --- | --- | --- | --- |

TABLE 1 includes a phone number, name, time, date, count value, and other fields for each entry corresponding to a caller identifier. More, fewer, or other fields, however, may be used. Phone number and name fields record the telephone number and name associated with communication device 20b, and time and date fields record the time and date of a call, for example, the latest call, with communication device 20b. The count value field records the number of times a call has been communicated to or from the communication device 20b.

The other field may include any suitable type of information. As an example, the other field may record whether the entry is associated with an incoming call or an outgoing call, an internal call or an external call, or an international call or a local call. The other field, however, may record any type of information that may be suitable for organizing the caller identifiers. TABLE 1 may include any additional or other information suitable for organizing caller identifiers.

According to one embodiment, table 44 may be programmed to have a maximum value such as a maximum number of entries or a maximum count value. If the addition of a new entry would cause the maximum value to be exceeded, a current entry may be deleted or modified. The current entry to be deleted or modified may be selected according to any suitable criteria, for example, a current entry having the oldest time and date values or having the lowest count value.

For example, if the addition of a new entry would cause a maximum number of entries to be exceeded, a current entry may be deleted. As another example, if the addition of a new entry would cause a maximum count value to be exceeded, a current entry may be modified by reducing the count value of the current entry. If the count value of the current entry is greater than one, the count value is decreased by one, and the time and date values are removed from the entry. If the count value is one, the entry is deleted from the table. The new entry is added, and the count value for the new entry is initialized to one.

User input/output modules 36 may be used to communicate signals to and from a user of telecommunication device 20a. According to the illustrated embodiment, user input/output modules 36 may include a ringer 50, a microphone 52, a speaker 54, a display 56, and a keyboard 58 coupled as shown in FIG. 2.

Ringer 50 may be used to notify the user of an incoming call. Microphone 52 may be used to receive voice data from the user to transmit to communication device 20b. Speaker

54 may be used to output voice data received from communication device 20*b*. Display 56 may be used to display information such as caller identifiers, and may comprise, for example, a liquid crystal display (LCD) or a light emitting diode (LDD). An example of display 56 is described in more detail with reference to FIG. 3. A user may use keyboard 58 to enter information for communication to processor 32. Keyboard 58 may comprise, for example, a numeric key pad.

Modifications, additions, or omissions may be made to communication device 20 without departing from the scope of the invention. Moreover, the operations of communication device 20 may be performed by more or fewer modules. For example, the operations of caller identifier interface 40 and caller identifier manager 41 may be performed by one module, or the operations of caller identifier manager 41 may be performed by more than one module. Additionally, functions may be performed using any suitable logic comprising software, hardware, other logic, or any suitable combination of the preceding.

Figure 3:
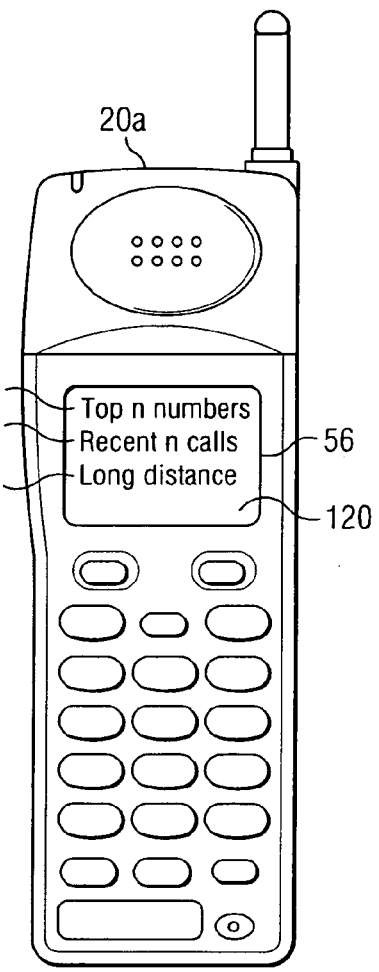
FIG. 3 is a diagram of one embodiment of a display displaying a menu of commands for organizing the caller identifiers.

FIG. 3 is a diagram illustrating one embodiment of display 56 displaying a menu of sort commands for organizing the caller identifiers. Communication device 20*a* displays the menu from which a user may select a sort command to organize the caller identifiers.

According to the illustrated embodiment, display 56 shows a menu 120 that includes one or more options 122*a–c*. A top n telephone numbers option 122*a* displays the caller identifiers of the n telephone numbers having the highest count values. A recent n calls option 122*b* displays the caller identifiers of the n most recent calls. A long distance option 122*c* may be used to display caller identifiers associated with long distance calls.

In response to the selection of a sort command, display 56 may display the caller identifiers organized according to the selected sort command. Display 56 may display a portion or all of the caller identifier information associated with a caller identifier. For example, display 56 may display the telephone number, name, time, date, count value, or any other suitable value, or any combination of the preceding. The user may select a caller identifier to initiate a call.

Figure 4:
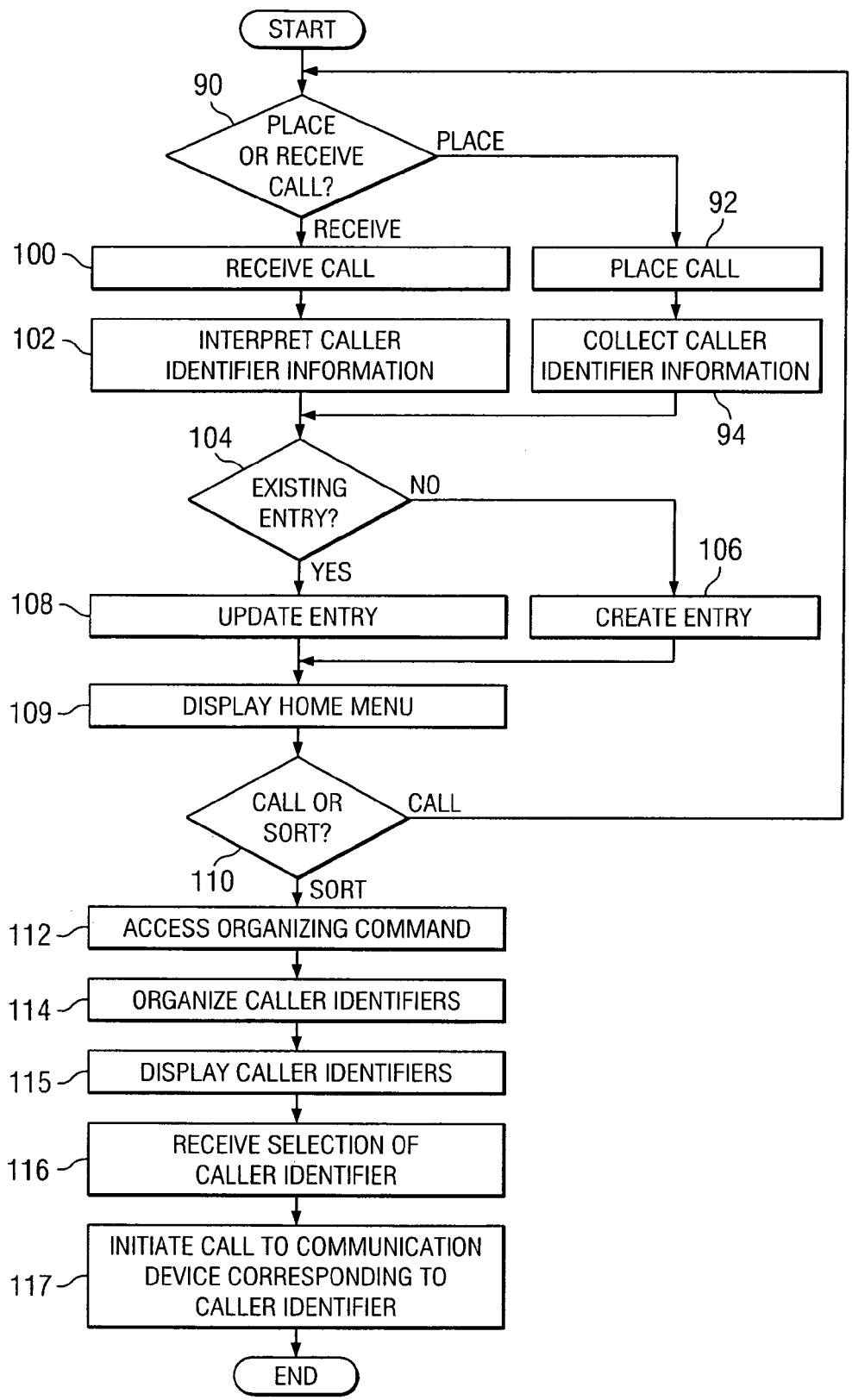
FIG. 4 is a flowchart of one embodiment of a method for managing caller identifiers.

FIG. 4 is a flowchart illustrating one embodiment of a method for managing caller identifiers. According to the method, communication device 20*a* stores caller identifiers associated with one or more communication devices 20*b* that communicate with communication device 20*a*. In response to a sort command, communication device 20*a* organizes the caller identifiers and displays the organized identifiers to a user. The user may select a caller identifier to call a communication device 20*b*.

According to the illustrated embodiment, communication device 20*a* may place a call to or receive a call from communication device 20*b* at step 90. If a call is placed at step 92, caller identifier manager 41 collects caller identifier information at step 94. The information may comprise, for example, a telephone number, name, time, and date associated with the call, and may be collected from a telephone number entered by the user and from information associated with the telephone number and stored at communication device 20. The method then proceeds to step 104.

If a call is received at step 100, caller identifier manager 41 interprets the caller identifier information from the received call at step 102. The caller identifier information may comprise, for example, a telephone number, name, time, and date associated with the call. The method then proceeds to step 104.

Caller identifier manager 41 checks whether there is an existing entry of tables 44 corresponding to the caller identifier at step 104. If there is no existing entry, the method proceeds to step 106, where caller identifier manager 41 creates an entry of table 44 corresponding to the caller identifier. The method then proceeds to step 109. If there is an existing entry corresponding to the caller identifier, caller identifier manager 41 updates the entry at step 108. The entry may be updated by, for example, increasing the count value of the entry indicating that another call associated with the caller identifier has been processed. The method then proceeds to step 109.

Display 56 of communication device 20*a* displays a home menu at step 109. The user may decide to place or receive a next call or to sort the caller identifiers, and may navigate through menus shown by display 56 to select the desired action. If a next call is to be placed or received at step 110, the method returns to step 90 to send or receive the next call. If a sort operation is to be performed at step 110, the method proceeds to step 112, where a sort command is accessed. The sort command may comprise a default command or a command received from the user. Caller identifier manager 41 organizes the caller identifiers in accordance with the sort command at step 114. The caller identifiers may be organized according to, for example, the count values associated with the caller identifiers. As an example, caller identifiers with higher count values are placed before caller identifiers with lower count values.

Display 56 displays the organized caller identifiers at step 115. The user may select one of the displayed caller identifiers in order to place a call to communication device 20*b* associated with the selected caller identifier. A selection of one of the caller identifiers is received from the user at step 116. In response, communication device 20*a* initiates a call to communication device 20*b* corresponding to the selected caller identifier at step 117. After initiating the call, the method terminates.

Modifications, additions, or omissions may be made to the method without departing from the scope of the invention. Additionally, steps may be performed in any suitable order without departing from the scope of the invention.

Certain embodiments of the invention may provide one or more technical advantages. A technical advantage of one embodiment may be that a user of a communication device may select the manner in which caller identifiers are to be displayed on the communication device. Accordingly, the embodiment may provide for more effective management of caller identifiers.

Although an embodiment of the invention and its advantages are described in detail, a person skilled in the art could make various alterations, additions, and omissions without departing from the spirit and scope of the present invention as defined by the appended claims.

What is claimed is:

1. A method for managing caller identifiers, comprising:
communicating a plurality of calls at a communication device, each call associated with a caller identifier;
storing the caller identifiers associated with the plurality of calls in response to the communication;
displaying an option to sort caller identifiers;
in response to the user selecting the option to sort caller identifiers, displaying a plurality of sort commands on a user interface to a user of the communication device, the plurality of sort commands used to organize and display the caller identifiers, the plurality of sort commands comprising:
a first sort command comprising:

determining a count value for each caller identifier, the count value of a caller identifier describing a number of calls associated with the caller identifier; and
arranging the caller identifiers in accordance with the count values;
a second sort command comprising:
determining a user name for each caller identifier; and
arranging the caller identifiers in accordance with the user names;
a third sort command comprises arranging the caller identifiers in numerical order;
a fourth sort command comprising:
determining a time and a date for each caller identifier; and
arranging the caller identifiers in accordance with the times and the dates; and
a fifth sort command comprising:
determining an origin category for each caller identifier
arranging the caller identifiers in accordance with the origin categories;
receiving a sort command selected from the plurality of sort commands by the user;
accessing the sort command at the communication device;
organizing the caller identifiers in accordance with the sort command; and
displaying at the communication device the organized caller identifiers to manage the caller identifiers.

2. The method of claim 1, further comprising:
receiving a selection of a caller identifier of the displayed caller identifiers; and
initiating a call corresponding to the selected caller identifier.

3. The method of claim 1, wherein organizing the caller identifiers in accordance with the sort command comprises:
determining whether each call associated with a caller identifier comprises an incoming call or an outgoing call; and
organizing the caller identifiers in accordance with the determination.

4. The method of claim 1, wherein organizing the caller identifiers in accordance with the sort command comprises:
determining a user name for each caller identifier; and
arranging the caller identifiers in accordance with the user names.

5. The method of claim 1, wherein organizing the caller identifiers in accordance with the sort command comprises:
determining a telephone number for each caller identifier; and
arranging the caller identifiers in accordance with the telephone numbers.

6. The method of claim 1, wherein:
organizing the caller identifiers in accordance with the sort command comprises selecting a subset of the caller identifiers according to a criterion; and
displaying the organized caller identifiers comprises displaying the subset of the caller identifiers.

7. A system for managing caller identifiers, comprising:
a memory operable to store a plurality of caller identifiers; and
a processor coupled to the memory and operable to:
communicate a plurality of calls at a communication device, each call associated with a caller identifier of the plurality of caller identifiers;
store the plurality of caller identifiers in response to the communication;
display an option to sort caller identifiers;
in response to the user selecting the option to sort caller identifiers, display a plurality of sort commands on a user interface to a user of the communication device, the plurality of sort commands used to organize and display the caller identifiers, the plurality of sort commands comprising:
a first sort command comprising:
determining a count value for each caller identifier, the count value of a caller identifier describing a number of calls associated with the caller identifier; and
arranging the caller identifiers in accordance with the count values;
a second sort command comprising:
determining a user name for each caller identifier; and
arranging the caller identifiers in accordance with the user names;
a third sort command comprises arranging the caller identifiers in numerical order;
a fourth sort command comprising:
determining a time and a date for each caller identifier; and
arranging the caller identifiers in accordance with the times and the dates; and
a fifth sort command comprising:
determining an origin category for each caller identifier
arranging the caller identifiers in accordance with the origin categories;
receive a sort command selected from the plurality of sort commands by the user;
access the sort command at the communication device;
organize the caller identifiers in accordance with the sort command; and
display at the communication device the organized caller identifiers to manage the caller identifiers.

8. The system of claim 7, the processor further operable to:
receive a selection of a caller identifier of the displayed caller identifiers; and
initiate a call corresponding to the selected caller identifier.

9. The system of claim 7, the processor operable to organize the caller identifiers in accordance with the sort command by:
determining whether each call associated with a caller identifier comprises an incoming call or an outgoing call; and
organizing the caller identifiers in accordance with the determination.

10. The system of claim 7, the processor operable to organize the caller identifiers in accordance with the sort command by:
determining a user name for each caller identifier; and
arranging the caller identifiers in accordance with the user names.

11. The system of claim 7, the processor operable to organize the caller identifiers in accordance with the sort command by:
determining a telephone number for each caller identifier; and
arranging the caller identifiers in accordance with the telephone numbers.

12. The system of claim 7, the processor operable to:
organize the caller identifiers in accordance with the sort command by selecting a subset of the caller identifiers according to a criterion; and
display the organized caller identifiers by displaying the subset of the caller identifiers.

13. A computer-readable memory encoded with a computer program for managing caller identifiers operable to:
communicate a plurality of calls at a communication device, each call associated with a caller identifier;
store the caller identifiers associated with the plurality of calls in response to the communication;
display an option to sort caller identifiers;
in response to the user selecting the option to sort caller identifiers, display a plurality of sort commands on a user interface to a user of the communication device, the plurality of sort commands used to organize and display the caller identifiers, the plurality of sort commands comprising:
a first sort command comprising:
determining a count value for each caller identifier, the count value of a caller identifier describing a number of calls associated with the caller identifier; and
arranging the caller identifiers in accordance with the count values;
a second sort command comprising:
determining a user name for each caller identifier; and
arranging the caller identifiers in accordance with the user names;
a third sort command comprises arranging the caller identifiers in numerical order;
a fourth sort command comprising:
determining a time and a date for each caller identifier; and
arranging the caller identifiers in accordance with the times and the dates; and
a fifth sort command comprising:
determining an origin category for each caller identifier
arranging the caller identifiers in accordance with the origin categories;
receive a sort command selected from the plurality of sort commands by the user;
access the sort command at the communication device;
organize the caller identifiers in accordance with the sort command; and
display at the communication device the organized caller identifiers to manage the caller identifiers.

14. The computer-readable memory of claim 13, further operable to:
receive a selection of a caller identifier of the displayed caller identifiers; and
initiate a call corresponding to the selected caller identifier.

15. The computer-readable memory of claim 13, operable to organize the caller identifiers in accordance with the sort command by:
determining whether each call associated with a caller identifier comprises an incoming call or an outgoing call; and
organizing the caller identifiers in accordance with the determination.

16. The computer-readable memory of claim 13, operable to organize the caller identifiers in accordance with the sort command by:
determining a user name for each caller identifier; and
arranging the caller identifiers in accordance with the user names.

17. The computer-readable memory of claim 13, operable to organize the caller identifiers in accordance with the sort command by:
determining a telephone number for each caller identifier; and
arranging the caller identifiers in accordance with the telephone numbers.

18. The computer-readable memory of claim 13, operable to:
organize the caller identifiers in accordance with the sort command by selecting a subset of the caller identifiers according to a criterion; and
display the organized caller identifiers by displaying the subset of the caller identifiers.

19. A system for managing caller identifiers, comprising:
means for communicating a plurality of calls at a communication device, each call associated with a caller identifier;
means for storing the caller identifiers associated with the plurality of calls in response to the communication;
means for displaying an option to sort caller identifiers;
in response to the user selecting the option to sort caller identifiers, means for displaying a plurality of sort commands on a user interface to a user of the communication device, the plurality of sort commands used to organize and display the caller identifiers, the plurality of sort commands comprising:
a first sort command comprising:
determining a count value for each caller identifier, the count value of a caller identifier describing a number of calls associated with the caller identifier; and
arranging the caller identifiers in accordance with the count values;
a second sort command comprising:
determining a user name for each caller identifier; and
arranging the caller identifiers in accordance with the user names;
a third sort command comprises arranging the caller identifiers in numerical order;
a fourth sort command comprising:
determining a time and a date for each caller identifier; and
arranging the caller identifiers in accordance with the times and the dates; and
a fifth sort command comprising:
determining an origin category for each caller identifier
arranging the caller identifiers in accordance with the origin categories;
means for receiving a sort command selected from the plurality of sort commands by the user;
means for accessing the sort command at the communication device;
means for organizing the caller identifiers in accordance with the sort command; and
means for displaying at the communication device the organized caller identifiers to manage the caller identifiers.

20. A method for managing caller identifiers, comprising:
communicating a plurality of calls at a communication device, each call associated with a caller identifier;

storing the caller identifiers associated with the plurality of calls in response to the communication;

displaying an option to sort caller identifiers;

in response to the user selecting the option to sort caller identifiers, displaying a plurality of sort commands on a user interface to a user of the communication device, the plurality of sort commands used to organize and display the caller identifiers, the plurality of sort commands comprising:

a first sort command comprising:
determining a count value for each caller identifier, the count value of a caller identifier describing a number of calls associated with the caller identifier; and
arranging the caller identifiers in accordance with the count values;

a second sort command comprising:
determining a user name for each caller identifier; and
arranging the caller identifiers in accordance with the user names;

a third sort command comprises arranging the caller identifiers in numerical order;

a fourth sort command comprising:
determining a time and a date for each caller identifier; and
arranging the caller identifiers in accordance with the times and the dates; and a fifth sort command comprising:
determining an origin category for each caller identifier
arranging the caller identifiers in accordance with the origin categories;

receiving a sort command selected from the plurality of sort commands by the user;

accessing the sort command at the communication device;

organizing the caller identifiers in accordance with the sort command by:
determining a count value for each caller identifier, the count value of a caller identifier describing a number of calls associated with the caller identifier, and arranging the caller identifiers in accordance with the count values;

determining whether each call associated with a caller identifier comprises an incoming call or an outgoing call, and organizing the caller identifiers in accordance with the determination;

determining a user name for each caller identifier, and arranging the caller identifiers in accordance with the user names;

determining a telephone number for each caller identifier, and arranging the caller identifiers in accordance with the telephone numbers; and selecting a subset of the caller identifiers according to a criterion;

displaying at the communication device the organized caller identifiers to manage the caller identifiers by displaying the subset of the caller identifiers;

receiving a selection of a caller identifier of the displayed caller identifiers; and initiating a call corresponding to the selected caller identifier.

* * * * *